UNITED STATES PATENT OFFICE.

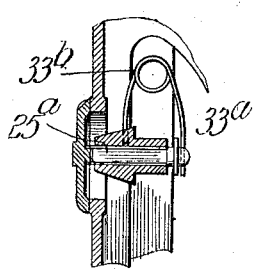
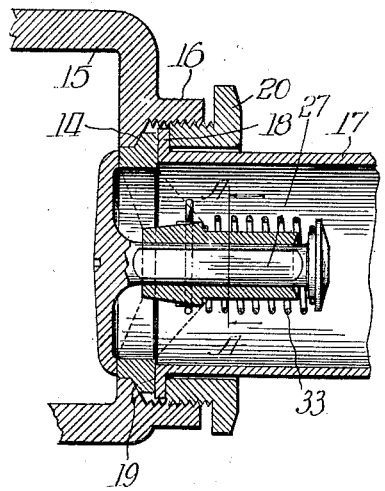
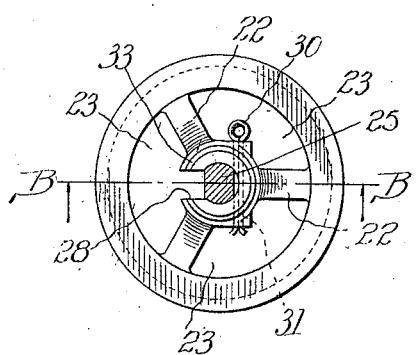
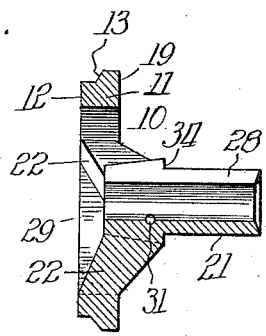
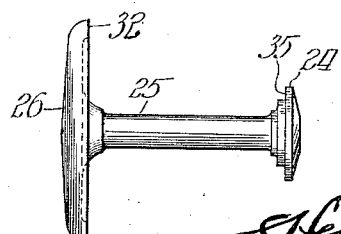

HENRY K. HOLSMAN, OF PLANO, ILLINOIS, ASSIGNOR TO THE INDEPENDENT HARVESTER COMPANY, OF PLANO, ILLINOIS, A CORPORATION OF ILLINOIS.

VALVE.

995,005. Specification of Letters Patent. Patented June 13, 1911.

Original application filed January 2, 1909, Serial No. 470,376. Divided and this application filed December 19, 1910. Serial No. 598,047.

*To all whom it may concern:*

Be it known that I, HENRY K. HOLSMAN, a citizen of the United States, and a resident of Plano, in the county of Kendall and State of Illinois, have invented certain new and useful Improvements in Valves, of which the following is a full, clear, and exact specification.

My invention is concerned with valves of the general type sometimes used for inlet valves in gas engines, and it is designed to produce a puppet valve that shall be very simple in its construction, light in weight, durable, and that can be easily assembled.

My present application is a division of my application No. 470,376, filed January 2, 1909, where the valve embodied in my present invention is shown in one form as the inlet valve of the gas engine covered by said application No. 470,376.

To illustrate my invention, I annex hereto a sheet of drawings, in which the same reference characters are used to designate identical parts in all the figures, of which,—

Figure 1 is a vertical section showing my valve utilized as an inlet valve and applied to the combustion chamber of a gas engine; Fig. 2 is a plan view of the valve as seen in section on the line A—A of Fig. 1; Fig. 3 is a longitudinal section of the valve casing, as seen on the line B—B of Fig. 2; Fig. 4 is a side elevation of the valve stem, with the integral head and retaining flange thereon; and Fig. 5 is a sectional view similar to Fig. 1, illustrating one form of my valve as applied to the piston head of a gas engine.

My improved valve is made up of the valve casing 10, which consists of an annulus 11, which has the annular valve seat 12 thereon, and preferably has the inclined annular surface 13 to coöperate with the corresponding inclined annular surface 14 in the combustion chamber 15 of a gas engine, or whatever other element it may coöperate with.

As shown in Fig. 1, the combustion chamber will be provided with the internally-threaded annular flange 16 with the annular surface 14 at the inner end thereof, and the inlet pipe 17 will have the outturned annular flange 18 engaging the annular bearing surface 19 on the annulus 11. By placing the parts in juxtaposition and tightly screwing up the externally-threaded nut 20, the reduced inner end of which coöperates with the flange 18, the various elements will be rigidly secured together to form an airtight connection between the inlet pipe 17 and the combustion chamber, said connection including the valve, as will be readily apparent.

The valve casing also has the guiding sleeve 21 for the valve stem, which guiding sleeve is preferably supported from the annulus 11 by the three arms 22. The three arms, together with the annulus 11 and the sleeve 21, form three apertures 23, of a suitable size to permit the passage of the retaining flange or head 24 secured on one end of the valve stem 25, which has the head 26 on the other end. As seen in Figs. 1 and 2, the valve stem 25 has the flattened surfaces 27, which make its diameter in one direction less than the width of the longitudinal slot 28 formed in one side of the guide sleeve 21 for the express purpose of permitting the entrance of the valve stem when it is turned at the proper angle. The slot 28, of course, communicates with the tubular bearing aperture 29 in the sleeve 21, and to hold the valve stem in place so it cannot escape after it has been inserted and turned at right angles, I pass a cotter pin 30 through an aperture 31 located in the bearing sleeve at a suitable point, so that the cotter pin thus positioned will bear against one of the flat sides 27 of the valve stem and prevent it from accidentally turning back to the position in which it could escape from the sleeve. The valve head 26 is integral with the stem 25 and has an annular bearing surface 32 to coöperate with the bearing surface 12 on the valve casing. To hold the surfaces 32 and 12 yieldingly in engagement, I preferably employ a helically-coiled expanding spring 33, which preferably has its outer spires reduced in diameter, as shown, one of them coöperating with the annular shoulder 34 formed on the sleeve 21, while the other end preferably coöperates with a similar annular shoulder 35 formed on the inner side of the retaining flange 24, which is also integral with the stem 25.

In Fig. 5, I have illustrated a slight modification, in which the cotter pin 30 is dispensed with, and for the helically-coiled expanding spring 33, I substitute the spring 33ª, which has one end suitably secured to some stationary part, while the other end passes through a transverse aperture near the end of the stem 25ª, and thus prevents said stem from turning, while the coils 33ᵇ of the spring serve to hold the valve head against the valve seat.

With the construction above described, it will be noted that by making the valve head, stem and retaining flange all in one piece, a lighter valve can be employed than is possible where either the head or the flange is secured to the stem in assembling the parts, as in that case the parts of the valve have to be made quite heavy in order to give them sufficient strength to stand the constant hammering these valves receive when in gas engines. By using a flattened stem passed through a slot in the guide, and then turning it to prevent its accidental withdrawal, and securing it from turning back so that it can be withdrawn, I get a simple, cheaply manufactured structure that can be readily assembled, and which will have a maximum durability with a minimum of weight.

While I have herein shown and described my invention as embodied in the form which I at present consider best adapted to carry out its purposes, it will be understood that it is capable of some modifications, and that I do not desire to be limited in the interpretation of the following claims except as may be necessitated by the state of the prior art.

What I claim as new, and desire to secure by Letters Patent of the United States, is:

1. In a device of the class described, the combination with a valve casing having a valve-seat surface, a stem-guiding sleeve with a longitudinal slot therein, and an aperture between the surface and the sleeve adjacent the slot; of a valve member comprising a head and retaining flange at opposite ends of a stem, said stem being flattened to pass through said longitudinal slot; and means to prevent the stem turning after the parts are assembled.

2. In a device of the class described, the combination with a valve casing having a valve-seat surface, a stem-guiding sleeve with a longitudinal slot therein and a small transverse aperture therethrough, and an aperture between the surface and the sleeve adjacent the slot; of a valve member comprising a head and retaining flange at opposite ends of a stem, said stem being flattened to pass through said longitudinal slot; and a pin passing through the transverse aperture in the sleeve and engaging a flattened side of the stem to prevent the latter from turning after the parts are assembled.

3. In a device of the class described, the combination with a valve casing having a valve-seat surface, a stem-guiding sleeve with a longitudinal slot therein, and an aperture between the surface and the sleeve adjacent the slot; of a valve member comprising a head and retaining flange at opposite ends of a stem, said stem being flattened to pass through said longitudinal slot; a spring interposed between the valve casing and the valve to hold the head in engagement with the valve-seat surface; and means to prevent the stem turning after the parts are assembled.

4. In a device of the class described, the combination with a valve casing having a valve-seat surface, a stem-guiding sleeve with a longitudinal slot therein and a small transverse aperture therethrough, and an aperture between the surface and the sleeve adjacent the slot; of a valve member comprising a head and retaining flange at opposite ends of a stem, said stem being flattened to pass through said longitudinal slot; a spring interposed between the valve casing and the valve to hold the head in engagement with the valve-seat surface; and a pin passing through the transverse aperture in the sleeve and engaging a flattened side of the stem to prevent the latter from turning after the parts are assembled.

5. In a device of the class described, the combination with a valve casing having a valve-seat surface, a stem-guiding sleeve with a longitudinal slot therein, a spring-supporting abutment thereon, and an aperture between the surface and the sleeve adjacent the slot; of a valve member comprising a head and retaining valve at opposite ends of a stem, said stem being flattened to pass through said longitudinal slot, a helically-coiled expanding spring surrounding the sleeve and abutting against the spring supporting abutment at one end and against the inner end of the retaining flange at the other end; and means to prevent the stem turning after the parts are assembled.

6. In a device of the class described, the combination with a valve casing having a valve-seat surface, a stem-guiding sleeve with a longitudinal slot therein, a spring supporting abutment thereon, and an aperture between the surface and the sleeve adjacent the slot; of a valve member comprising a head and retaining flange at opposite ends of a stem, said stem being flattened to pass through said longitudinal slot, a helically-coiled expanding spring surrounding the sleeve and abutting against the spring supporting abutment at one end and against the inner end of the retaining flange at the other end; and means to prevent the stem turning after the parts are assembled, said means consisting of a cotter pin passed through the stem-guiding sleeve so as to bear against one of the flattened sides of the stem to prevent its turning.

7. In a device of the class described, the combination with a valve casing composed of the annulus 11 having bearing surfaces 12, 13 and 19, a stem-guiding sleeve 21 with the longitudinal slot 28 therein and a transverse aperture 31, and radial arms 22 connecting the annulus and the sleeve; of a valve member comprising the head 26 and the retaining flange 24 connected by the stem 25 having the flattened surface 27; the spring 33 interposed between the sleeve 21 and the retaining flange 24; and a cotter pin 30 adapted to pass through the aperture 31 to engage the flattened side 27 of the valve stem.

In witness whereof, I have hereunto set my hand and affixed my seal, this 12th day of December A. D. 1910.

HENRY K. HOLSMAN. [L. S.]

Witnesses:
C. E. MANNING,
G. W. McCUEN.

Copies of this patent may be obtained for five cents each, by addressing the "Commissioner of Patents, Washington, D. C."